United States Patent [19]

Sumida et al.

[11] 3,968,477

[45] July 6, 1976

[54] CONTROL APPARATUS FOR ELECTRICAL DEVICES

[75] Inventors: Shizuo Sumida; Kazuo Nii, both of Hiroshima; Osamu Shimizu, Himeji; Atsushi Ueda, Himeji; Mitsuaki Ishii, Himeji, all of Japan

[73] Assignees: Mitsubishi Denki Kabushiki Kaisha, Tokyo; Toyo Kogyo Co., Ltd., both of Japan

[22] Filed: July 29, 1974

[21] Appl. No.: 492,724

[30] Foreign Application Priority Data

July 27, 1973 Japan .............................. 48-84740

[52] U.S. Cl. .......................... 340/167 R; 340/413; 340/255

[51] Int. Cl.[2] ........................................ H04Q 9/16

[58] Field of Search ........... 340/147 R, 147 C, 150, 340/152, 151, 167 R, 168 R, 413, 255

[56] References Cited

UNITED STATES PATENTS

| | | | |
|---|---|---|---|
| 3,122,722 | 2/1964 | Subry et al. | 340/152 R |
| 3,333,245 | 7/1967 | Schildgen et al. | 340/147 C |
| 3,384,874 | 5/1968 | Morley et al. | 340/151 X |
| 3,544,803 | 12/1970 | Taylor | 340/168 R |
| 3,594,789 | 7/1971 | Rotier | 340/413 |
| 3,611,361 | 10/1971 | Gallichotte et al. | 340/150 X |
| 3,622,997 | 11/1971 | Casella et al. | 340/167 R |
| 3,634,824 | 1/1972 | Zinn | 340/167 A |

*Primary Examiner*—Donald J. Yusko
*Attorney, Agent, or Firm*—Oblon, Fisher, Spivak, McClelland & Maier

[57] ABSTRACT

A control apparatus for controlling a plurality of electrical devices comprising a plurality of electrical devices, a central operation device for generating a plurality of control signals for controlling the electrical devices, the plurality of control signals comprising a first signal for driving a first electrical device and a second signal delayed in time from the first signal to permit discontinuance of the driving of the first electrical device if a high current is detected passing therethrough, a terminal operation device for each electrical device, a signal transmission line for transmitting the plurality of control signals from the central operation device to the terminal operation devices, a first terminal operation device for driving the first electrical device comprising a signal division circuit for dividing from the plurality of control signals said first and second signals, a driving circuit connected to the signal division circuit for driving the first electrical device in response to said first signal, a state detecting circuit for detecting a high current in the first electrical device, a state signal generating circuit connected to the state detecting circuit, the signal division circuit and the driving circuit for deactivating the driving circuit to discontinue the driving of the first electrical device only upon receipt of a signal from the state detecting circuit indicating high current in the first electrical device and receipt at the same time of said second signal, said second signal being delayed in time from said first signal so that high transient starting current in the first electrical device has subsided by the time of said second signal so that driving of the first electrical device will be discontinued when high current is present therein with the exception of the presence of high transient starting current.

5 Claims, 27 Drawing Figures

CONTROL APPARATUS FOR ELECTRICAL DEVICES

BACKGROUND OF THE INVENTION

1. Field of the Invention

The present invention relates to a control apparatus for electrical devices. More particularly, the present invention relates to a control apparatus for controlling a plurality of electrical devices by transmitting multiple control signals through a small number of electrical lines for controlling, and detecting the state of each of the electrical devices.

2. Description of the Prior Art

In general, the amount of electrical devices equipped in vehicles, ships or various control apparatus has been increasing. The wiring required for complicated electrical devices has become difficult and the finding of faults in order to make necessary repairs has become difficult.

In order to overcome such difficulties, it has been proposed that a control system for controlling a plurality of electrical devices be used by transmitting multiple control signals through a small number of control signal transmission lines (wires).

It is also necessary to prevent breakage or damage to the electrical devices by detecting a fault in the electrical devices and to prevent erroneous operation of the control apparatus due to a "rush current" or a "starting current" at the initiation of the driving of the electrical devices, such as a lamp, motor or the like.

FIG. 1 is a block diagram showing a basic embodiment of a multiple control apparatus for transmitting time division multiple control signals and for controlling *n* numbers of electrical devices.

In FIG. 1, the control apparatus comprises electrical devices 1*a*–1*n;* a central operation device 2; a reference timing signal generation circuit 3; a control signal generation circuit 4; a reference timing signal transmission line 5; a control signal transmission line 6; terminal operation devices 7*a*–7*n* corresponding to the electrical devices 1*a*–1*n;* signal division circuits 8*a*–8*n;* driving circuits 9*a*–9*n;* set-reset flips-flops 10*a*–10*n* (hereinafter referred to as R-S flip-flops); resistances 11*a*–11*n;* transistors 12*a*–12*n* for driving the electrical devices 1*a*–1*n;* terminals 13*a*–13*n* connected to a DC power source (not shown); and contacts 14*a*–14*n* for connecting the transistors 12*a*–12*n* to the electrical devices 1*a*–1*n.*

FIGS. 2*a*–2*e* are a timing chart for illustrating the operation of the control apparatus of FIG. 1. FIG. 2*a* shows the output waveform of the reference timing signal generation circuit 3 including the reference timing signal pulse P. FIG. 2*b* shows the output waveform a. the control signal pulses T*a*–T*n*. FIGS. 2*c* and 2*d* show the output waveforms of the signal division circuit 8*a* and FIG. 2*e* shows the output of the R-S flip-flop 10*a*

The operation of the control apparatus of FIG. 1 is briefly described referring to the timing charts of FIGS. 2*a*–2*e*. The reference timing signal generation circuit 3 generates the reference timing signal pulse P as shown in FIG. 2*a* and transmits it to the reference timing signal transmission line 5.

The control signal generation circuit 4 generates a control signal depending upon the reference timing signal as shown in FIG. 2*b* and transmits it to the control signal transmission line 6.

The control signal comprises control signal pulses T*a*–T*n* corresponding to the electrical devices 1*a*–1*n* and a synchronizing signal S which is of a longer pulse width than those of the control signal pulses T*a*–T*n*. When a control signal pulse T*a*–T*n* is generated, the corresponding electrical device 1*a*–1*n* is driven. On the contrary, when a control signal pulse T*a*–T*n* is not generated (such as shown by the dotted line), then the corresponding electrical devices 1*a*–1*n* is not driven. A terminal operation device 7*a*–7*n* controls the corresponding electrical device 1*a*–1*n* depending upon the control signal generated by the control signal generation circuit 4.

Since all of the terminal operation devices 7*a*–7*n* have the same structure, only terminal operation device 7*a* is described in detail. The signal division circuit 8*a* is connected to the reference timing signal transmission line 5 and the control signal transmission line 6, whereby the reference timing signal pulses P are counted to detect the synchronizing signal having a long pulse width, so as to identify the initiation of the repeating period of the multiple control signal. The signal division circuit 8*a* counts the reference timing signal pulses P to detect the transmission of the control signal pulse T*a* during the time period corresponding to the electrical device 1*a*, and a signal therefrom is applied to the set terminal S*a* and the reset terminal R*a* of the R-S flip-flop 10*a* as shown in FIGS. 2*c* and 2*d.*

The control signal pulse T*a* is transmitted at the time $t_1$, and the signal pulse U of FIG. 2*c* is applied at that time to the set terminal S*a* of the R-S flip-flop 10*a* whereby the output signal of the output terminal $\overline{Q}a$ is changed as shown in FIG. 2*e*, and the transistor 12*a* is turned on to drive the electrical device 1*a*.

At the time $t_1$, the signal pulse V as shown in FIG. 2*d*, is not generated at the reset terminal R*a* of the R-S flip-flop 10*a*.

At the time $t_2$, the control signal pulse T*a* is not transmitted; the signal pulse U is not applied to the set terminal S*a* of the R-S flip-flop 10*a;* the signal pulse V is applied to the reset terminal R*a;* the output signal of the output terminal $\overline{Q}a$ is changed as shown in FIG. 2*e;* the transistor 12*a* is turned off and the driving of the electrical device 1*a* is stopped.

It should be understood that the other terminal operation devices 7*b*–7*n* act similar to the operation just described and that the electrical devices 1*b*–1*n* are driven when the corresponding control signal pulses T*b*–T*n* are transmitted.

On the other hand, the electrical devices 1*b*–1*n* are not driven when the control signal pulses T*b*–T*n* are not transmitted.

In the terminal operation devices 7*a*–7*n* of the control apparatus of FIG. 1, when one of the electrical devices 1*a*–1*n* causes a short circuit fault in the ON state of the transistors 12*a*–12*n*, an overcurrent will be passed through the transistor 12*a*–12*n* and thereby break or damage the same. Accordingly, it is necessary to prevent such a short-circuit fault.

FIG. 3 shows a circuit for protecting a short-circuit fault in the ON state of the transistors 12*a*–12*n* of the control device of FIG. 1 and thereby preventing breaking or damaging of the same. In FIG. 3, only the terminal operating circuit 7*a* is exemplified however, it is to be understood that the other terminal operation circuits 7*b*–7*n* can have a similar structure.

The circuit of FIG. 3 comprises a state detecting circuit 15*a* which includes a NOR circuit 16*a* and a state signal generation circuit 17*a* which includes an R-S flip-flop 18*a* and an OR circuit 19*a*.

FIGS. 4*a*–4*g* show timing charts for illustrating the operation of the circuit of FIG. 3. In FIGS. 4*a*–4*e*, like reference numerals designate identical or corresponding parts to FIGS. 2*a*–2*e*; FIG. 4*f* shows the output of the NOR circuit 16*a* and FIG. 4*g* shows the output of the R-S flip-flop 18*a*.

When the control signal plate T*a* is transmitted to the electrical device 1*a*, the output signal of the R-S flip-flop 10*a* at the time $t_1$ in FIG. 4*e* becomes of a low level and the electrical device 1*a* is driven. When a short-circuit fault is caused at the time $t_2$, the potential at the contacts 14*a* of the electrical device 1*a* and the transistor 12*a* is at a low level potential, even though the transistor 12*a* is turned on, whereby the NOR circuit 16*a* detects the short-circuit fault to generate a high level output signal as shown in FIG. 4*f*. This high level signal is then applied to the set terminal S*a*′ of the R-S flip-flop 18*a*. The high level signal at the output terminal Q*a*′ of the R-S flip-flop 18*a* then becomes of a high level, whereby the R-S flip-flop 10*a* is reset; and the driving of the electrical device 1*a* is stopped. The width of the output signal pulse W of the NOR circuit 16*a* which is shown in FIG. 4*f*, is decided by the delay time of the circuit operation.

Once a short-circuit fault is detected, the R-S flip-flop 18*a* will continue to reset the R-S flip-flop 10*a* until such time as the driving stop command is transmitted to the electrical device 1*a*.

When the control signal pulse T*a* is not transmitted at the time $t_3$ and the state of the contact 14*a* is released to the normal state, then the R-S flip-flop 18*a* is reset, and the signal at the output terminal Q*a*′ has no relationship with the normal operation.

In accordance with the above, a short-circuit fault is detected to prevent breakage or damage of the transistor 12*a*.

In the circuit of FIG. 3, when the electrical device 1*a* is a device such as a lamp or a motor, a high "rush current" or a high "starting current" is passed at the initiation of the driving.

Accordingly, a long time is required for the potential at the contact 14*a* to reach the power voltage at the initiation of driving.

In the transient state, the output signal of the R-S flip-flop 10*a* is of a low level so as to drive the electrical device 1*a*. However, since the potential of the contact 14*a* is of a low level, the NOR circuit 16*a* generates an output signal to set the R-S flip-flop 18*a*.

Thus, with the above described terminal operation device of FIG. 3, a problem exists in that the transient state can be detected as a short-circuit fault, and the R-S flip-flop 10*a* is immediately reset whereby the electrical device 1*a* is not driven.

SUMMARY OF THE INVENTION

Accordingly, it is an object of the present invention to provide a new and improved unique multiple control apparatus comprising a fault detecting device wherein the time for detecting a fault is centrally commanded from a central operation device to thereby overcome the disadvantages caused in the transient state.

Briefly, in accordance with the present invention, the foregoing and other objects are in one aspect attained by the provision of a control apparatus for multiple-controlling electrical devices having a plurality of electrical devices, a central operation device for centrally generating multiple control signals for controlling the electrical devices, a signal transmission line for transmitting the multiple control signals and a plurality of terminal operation devices. The terminal operation devices include a signal division circuit for dividing the multiple control signals and for generating a driving command signal of each corresponding electrical device, a driving circuit for driving each electrical device depending upon the driving command signal generated from the signal division circuit, and a state detecting circuit for detecting the state of each electrical device at a contact between each driving circuit and each electrical device.

The central operation device includes a command circuit for centrally generating command signals for instructing a detection time for detecting the state of each electrical device at a discretional time from the central operation device to the electrical device, and a state signal generation circuit in each terminal operation device for generating a state signal indicating the state of each electrical device depending upon the command signal generated from the command circuit.

BRIEF DESCRIPTION OF THE DRAWINGS

A more complete appreciation of the invention will be readily obtained as the same becomes better understood by reference to the following detailed description when considered in connection with the accompanying drawings wherein.

DETAILED DESCRIPTION OF THE PREFERRED EMBODIMENTS

Figure 1:
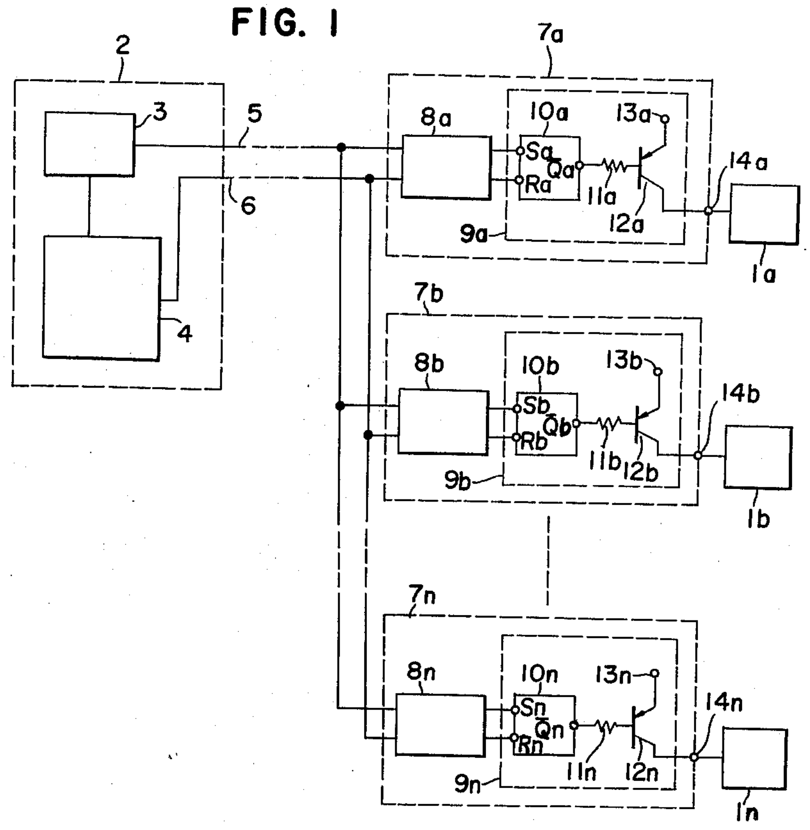
FIG. 1 is a block diagram showing a multiple control apparatus.
Figure 2:
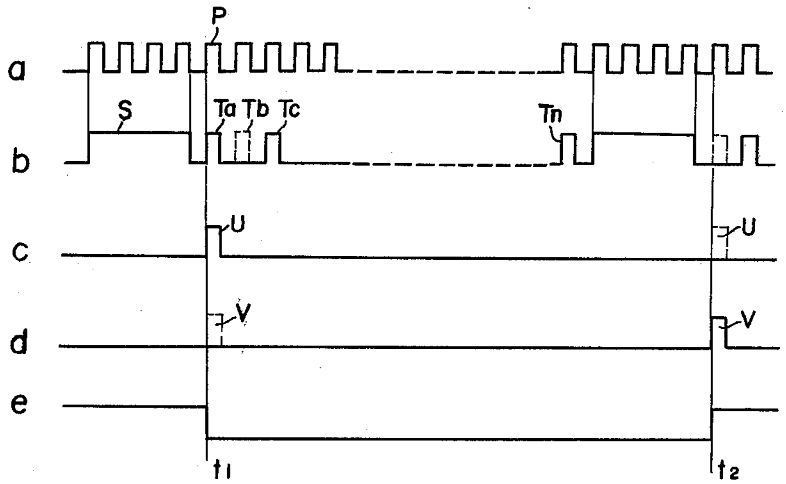
FIGS. 2*a*–2*e* are timing charts for illustrating the operation of the control apparatus of FIG. 1.
Figure 3:
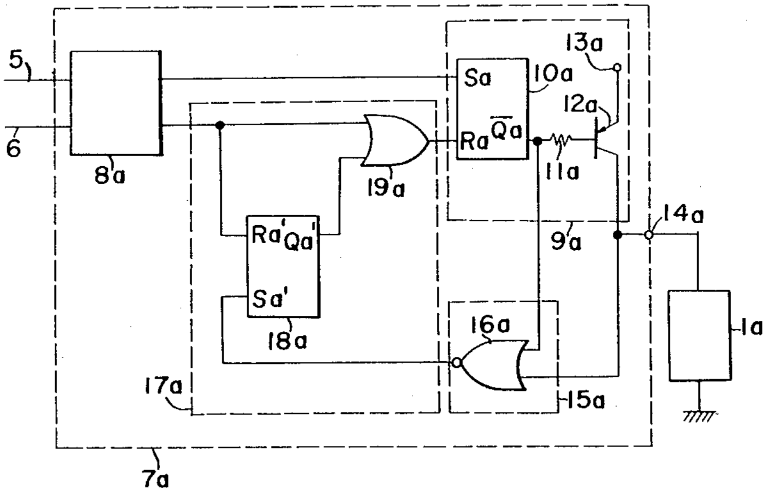
FIG. 3 is a terminal operation device for detecting a fault of the electrical device in the control apparatus of FIG. 3.

The drawings will now be referred to wherein like reference numerals refer to or designate identical or corresponding parts throughout the several views.

The present invention is to overcome the disadvantages in the transient state by centrally commanding the time for detecting a fault from a central operation device in a multiple control apparatus comprising a fault detecting device.

Figure 5:
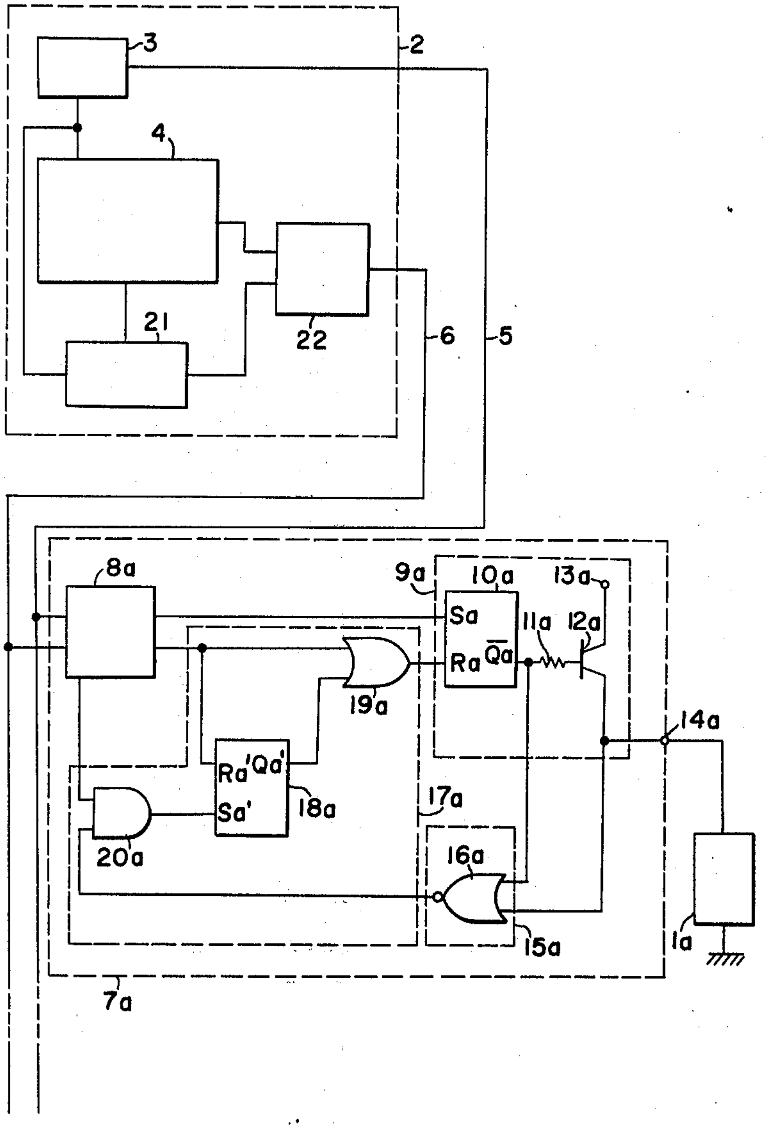
FIG. 5 is a block diagram of one preferred embodiment of the control apparatus of the present invention.

FIG. 5 shows one preferred embodiment of the present invention in which the transient state at the initiation of, for example, a lamp or motor driving, is not erroneously detected by accident as a short-circuit fault.

In FIG. 5, the reference 20a designates an AND circuit; 21 a command circuit; and 22 a signal composite circuit.

In FIG. 5, it is possible to return a signal to the central operation device while simultaneously transmitting the output signal from the output terminal Qa' of the flip-flop 18a to the OR circuit 19a.

FIGS. 6a, 6b, 6e, 6f, 6h, and 6i are timing charts for illustrating the operation of the apparatus of FIG. 5.

Figure 6:
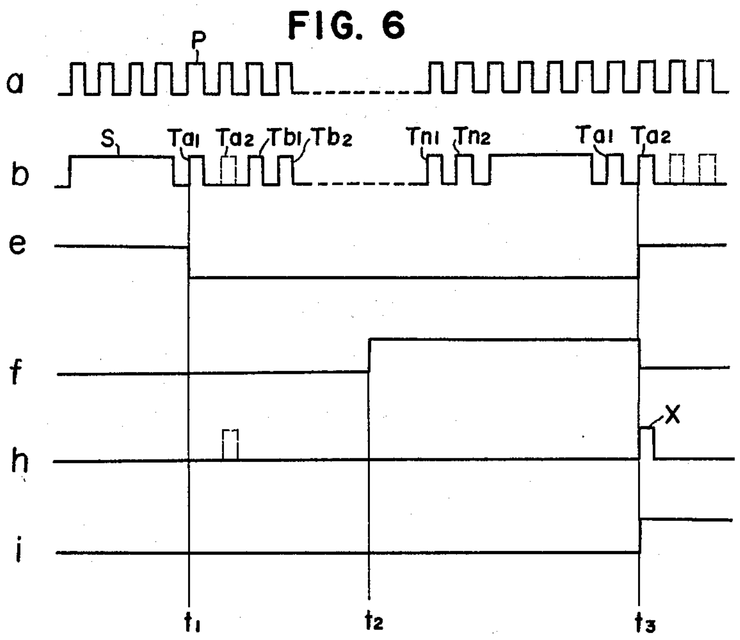
FIGS. 6*a*, 6*b*, 6*e*, 6*f*, 6*h* and 6*i* are timing charts for illustrating the operation of the control apparatus of FIG. 5.

FIG. 6h designates the output signal of the signal division circuit 8a and in FIG. 6b, $Ta_1$–$Tn_1$ designate control signal pulses corresponding to the electrical devices 1a–1n and and $Ta_2$–$Tn_2$ designate command signal pulses corresponding to the terminal operation circuits 7a–7n. FIG. 6i designates a signal finding at the output terminal Qa' of the R-S flip-flop 18a.

The operation of the apparatus of FIG. 5 is described with reference to the timing charts of FIGS. 6a, 6b, 6e, 6f, 6h and 6i.

In the central operation device 2, the control signal generation circuit 4 generates the control signal pulses $Ta_1$–$Tn_1$ corresponding to the electrical devices 1a–1n.

The command circuit 21 generates the command signal pulses $Ta_2$–$Tn_2$ instructing the time for detecting a fault at the terminal operation devices 7a–7n.

When the command signal pulses $Ta_2$–$Tn_2$ corresponding to the terminal signal operation devices 7a–7n are generated, the fault detection is performed. On the other hand, when the command signal pulses $Ta_2$–$Tn_2$ are not generated, fault detection is not performed.

The signal composite circuit 22 serves to compose the output signal of the control signal generation circuit 4 and the output signal of the command circuit 21, and to generate the control signal as shown in FIG. 6b, which is transmitted to the control signal transmission line 6.

In the terminal operation device 7a, the signal division circuit 8a divides the control signal pulse $Ta_1$ at the time $t_1$ and drives the driving circuit 9a to drive the electrical device 1a.

When the electrical device 1a is in a short-circuit state such as at the time $t_2$, the contact 14a is at ground potential, even though the transistor 12a is driven. The output signal of the NOR circuit 16a is changed as shown in FIG. 6f, and is applied to one of the input terminals of the AND circuit 20a.

At the time $t_2$, the signal applied to the other input terminal of the AND circuit 20a is of a low level as shown in FIG. 6h. The signal at the output terminal Qa' of the R-S flip-flop 18a is at low level as shown in FIG. 6i, whereby the R-S flip-flop 10a is not reset and the transistor 12a maintains the driving state.

At the time $t_3$, the command signal pulse $Ta_2$ is transmitted to the terminal operation device 7a.

The signal division circuit 8a divides the command signal pulse $Ta_2$, and the signal pulse X shown in FIG. 6h is applied to one of the input terminals of the AND circuit 20a.

When the electrical device 1a is in a short-circuit state, and the output of the NOR circuit 16a is at a high level, the AND circuit 20a generates an output signal at the same time the signal pulse X is generated, whereby the R-S flip-flop 18a is set.

Figure 4:
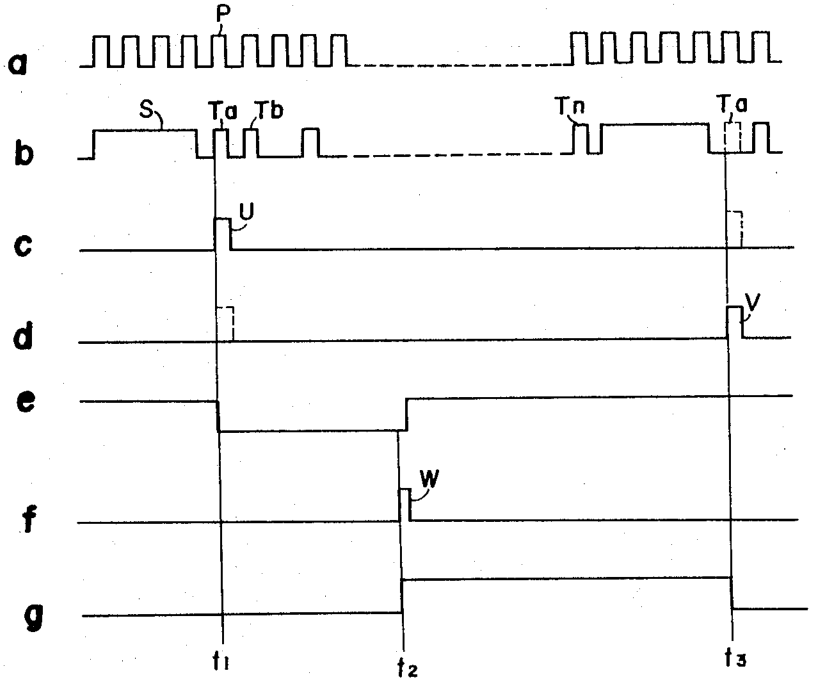
FIGS. 4*a*–4*g* are timing charts for illustrating the operation of the circuit of FIG. 3.

Accordingly, the output terminal of the R-S flip-flop 18a is changed, as shown in FIG. 4i, the R-S flip-flop 10a is reset, and the driving of the electrical device 1a is stopped.

As stated above, even though the driving command signal pulse $Ta_1$ begins to transmit to the electrical device 1a and the electrical device 1a is, for example, a lamp or a motor which passes a rush current or a starting current to give a transient short-circuit state at the initiation of driving, the AND circuit 20a does not generate an output signal in the pre-determined time for transmitting the command signal $Ta_2$, the R-S flip-flop 18a is not set and the R-S flip-flop 10a is not reset. Accordingly, the transistor 12a maintains its driving state and the driving of the transistor 12a is stopped at the time for transmitting the next command signal pulse $Ta_2$, whereby breakage or damage of the transistor is prevented.

Although the terminal operation circuit 7a has been discussed above, it is to be understood that the other terminal operation devices 7b–7n can have the same structure.

Figure 7:
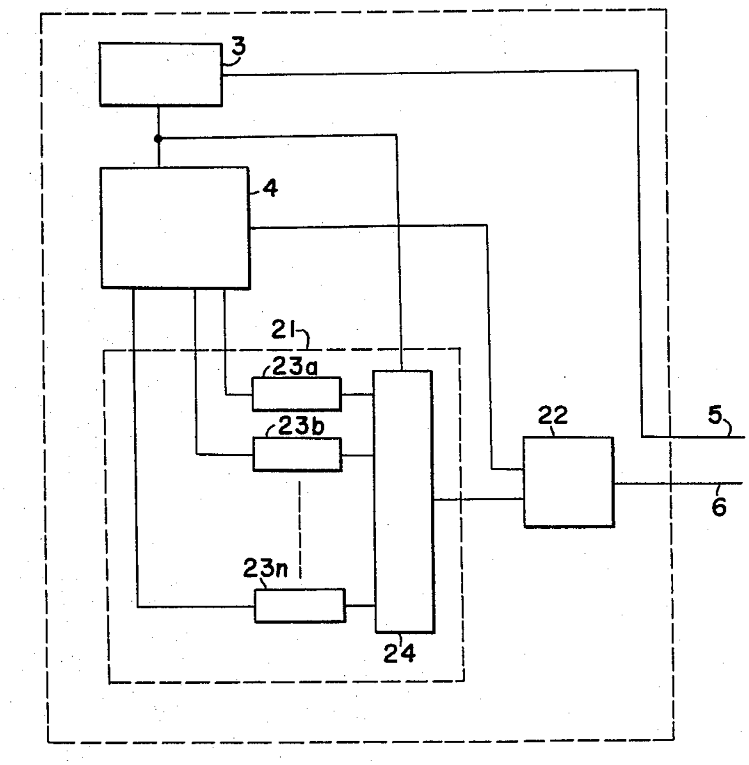
FIG. 7 is a block diagram of another preferred embodiment of the control apparatus of the present invention.

The command circuit for generating the command signal pulses $Ta_2$–$Tn_2$ can have the structure shown in FIG. 7.

In FIG. 7, the references 23a–23n designate delay circuits and the reference 24 designates a command signal composite circuit.

FIGS. 8j, 8k, 8l and 8b are timing charts for illustrating the operation of the apparatus of FIG. 7.

Figure 8:
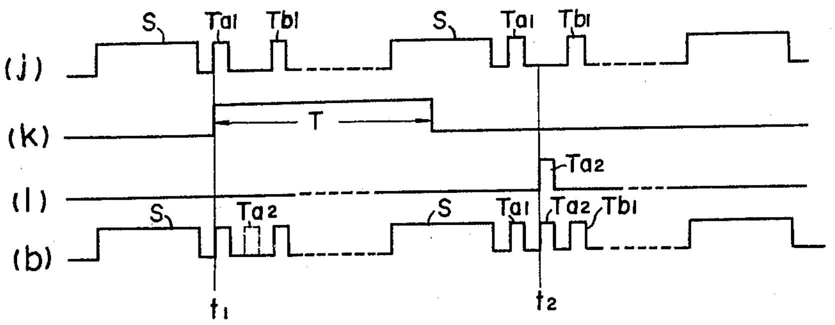
FIGS. 8*j*, 8*k*, 8*l*, and 8*b* are timing charts for illustrating the apparatus of FIG. 7.

FIG. 8j designates the output waveform of the control signal generation circuit 4; FIG. 8k designates the output waveform of the delay circuit 23a; and FIG. 8l designates the output waveform of the command signal composite circuit 24.

The operation of the apparatus of FIG. 7 is described by referring to the timing chart of FIGS. 8j, 8k, 8l and 8b.

The delay circuits 23a–23n correspond to the electrical devices 1a–1n and also correspond to the command signal pulses $Ta_2$–$Tn_2$.

The delay circuits generate a signal with a predetermined pulse width T after the time $t_1$ when the control signal pulse $Ta_1$ corresponding to the electrical device 1a begins to be generated and the electrical device 1a begins to be driven, as shown in FIG. 8k.

When the delay circuit 23a generates the signal having the predetermined time period T, the command signal composite circuit 24 does not generate the command signal pulse $Ta_2$ corresponding to the electrical device 1a.

After the generation of the signal having the predetermined time period T is stopped, the command signal pulse $Ta_2$ corresponding to the electrical device 1a is generated and the command signal pulse is transmitted to the signal composite circuit 22.

The delay circuits 23b–23n generate a signal having a predetermined time period T from the time of generating the corresponding control signal pulse $Tb_1$–$Tn_1$.

The command signal composite circuit 24 generates the corresponding command signal pulses $Tb_2$–$Tn_2$ after the generation of the signal having the predetermined time period from the delay circuit 23b–23n is stopped.

The command signal pulses $Ta_2$–$Tn_2$ are composed with the output signal of the control signal generation circuit 4 as shown in FIG. 8j, and the composite signal is transmitted to the control signal transmission line as the control signal in FIG. 8b. Thus, with the present embodiment it is possible to inhibit detection of the transient short-circuit state during the time period determined by the delay circuits 23a–23n at the initiation of driving of the corresponding electrical devices 1a–1n.

The set time period of the corresponding delay circuits 23a–23n can be discretionally set depending upon the transient characteristics of the electrical devices 1a–1n by the command signal.

In the present embodiment, the check-up command generating circuit 2 is coomposed of a plurality of delay circuits each corresponding to the electrical devices 1a–1n.

However, it is possible to set the signal having the predetermined time period by operating sequentially in series such as by using n bit shift-registers. In accordance with such an embodiment, it is possible to centrally instruct from the central operation device 2 without increasing the elements of the terminal operation device 7a–7n. .

Figure 9:
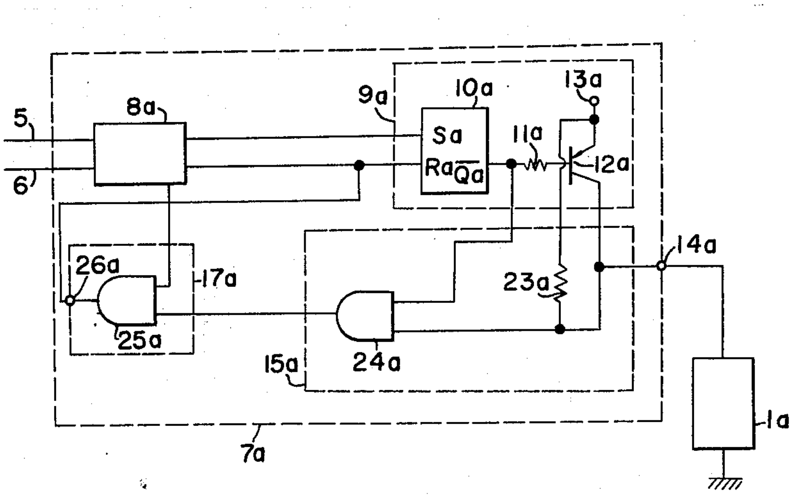
FIG. 9 is a block diagram of still another preferred embodiment of the control apparatus of the present invention.

FIG. 9 shows still another preferred embodiment of the present invention. Since the structure of the central operation device is the same as that of FIG. 5, it is not shown in the drawing.

Only the terminal operation circuit 7a is shown, however, it is to be understood that the other terminal operation devices can be the same.

FIG. 9 shows a block diagram of the circuit for detecting a fault of disconnection of the electrical device 1a in the terminal operation device 7a.

In FIG. 9, the reference 23a designates a resistance; and the references 24a and 25a designate AND circuits.

The embodiment of FIG. 9 is described as follows. In the state detecting circuit 15a, the value of the resistance 23a is much greater than the impedance of the electrical device 1a. Accordingly, the transistor 12a is not driven.

When the electrical device 1a is not disconnected, the potential of the contact 14a is substantially at ground potential whereby the AND circuit 25a does not generate an output signal.

When the electrical device is disconnected at the time of the transistor 12a being in a non-driven state, the potential of the contact 14a is substantially the same as the power voltage and the AND circuit generates an output signal.

The command signal pulse $Ta_2$ divided by the signal division circuit 8a is applied to the other input terminal of the AND circuit 25a.

The signal indicating the state of the electrical device 1a is generated from the output terminal of the AND circuit 25ato the reset input of the set-reset flip-flop 10a only when the command signal pulse $Ta_2$ is transmitted.

That is, a fault signal indicating disconnection is generated only when the electrical device 1a is disconnected and the command signal pulse $Ta_2$ is transmitted.

Accordingly, the time for detecting the fault by the command circuit 21 can be instructed depending upon the demand.

As stated above, the signal indicating the fault state can be multiplely transmitted in return.

It should now be apparent that in accordance with the apparatus of the present invention, a central operation device can centrally generate a check-up command, whereby it is possible to stop the generation of a fault signal at the time of a transient state (seems to be a fault state).

Accordingly, it is possible to always generate accurate fault signals and also to detect faults at a discretional time, if necessary.

Obviously, various additional changes may be carried out in the present invention without departing from the spirit and scope of the invention as defined in the following claims.

What is claimed as new and desired to be secured by Letters Patent of the United States is:

1. A control apparatus for controlling a plurality of electrical devices comprising:

a plurality of electrical devices, a central operation device for generating a plurality of control signals for controlling the electrical devices, the plurality of control signals comprising a first signal for driving a first electrical device and a second signal delayed in time from the first signal to permit discontinuance of the driving of the first electrical device if a high current is detected passing therethrough, a terminal operation device for each electrical device, a signal transmission line for transmitting the plurality of control signals from the central operation device to the terminal operation devices, a first terminal operation device for driving the first electrical device comprising:

a signal division circuit for dividing from the plurality of control signals said first and second signals, a driving circuit connected to the signal division circuit for driving the first electrical device in response to said first signal, a state detecting circuit for detecting a high current in the first electrical device, a state signal generating circuit connected to the state detecting circuit, the signal division circuit and the driving circuit for deactivating the driving circuit to discontinue the driving of the first electrical device only upon receipt of a signal from the state detecting circuit indicating high current in the first electrical device and receipt at the same time of said second signal, said second signal being delayed in time from said first signal so that high transient starting current in the first electrical device has subsided by the time of said second signal so that driving of the first electrical device will be discontinued when high current is present therein with the exception of the presence of high transient starting current.

2. A control apparatus in accordance with claim 1 wherein the state detecting circuit comprises a NOR gate, the state signal generation circuit comprises an AND gate, a first set-reset flip-flop and an OR gate, the driving circuit comprises a set-reset flip-flop and a transistor, means connecting the output of the NOR gate to a first input of the AND gate, means connecting a second input of the AND gate to the signal division circuit, means connecting the output of the AND gate to the set input of the first set-reset flip-flop, means connecting the signal division circuit to the reset input of the first set-reset flip-flop, means connecting the output of the first set-reset flip-flop to a first input of the OR gate, means connecting the signal division circuit to a second input of the OR gate, means connecting the output of the OR gate to the reset input of the second set-reset flip-flop, means connecting the signal division circuit to the set input of the second set-reset flip-flop, means connecting the output of the second set-reset flip-flop to the input of the transistor, means connecting the output of the transistor to the first electrical device and to a first input of the NOR gate and means connecting the output of the second set-reset flip-flop to a second input of the NOR gate.

3. A control apparatus in accordance with claim 1 wherein the signal transmission line comprises a reference timing signal transmission line and a control signal transmission line an *d* the central operation device comprises a reference timing signal generation circuit, a control signal generation circuit, a command circuit, and a signal composite circuit, means connecting a first output of the reference timing signal generation circuit to the reference timing signal transmission line, means connecting a second output of the reference timing signal generation circuit to the control signal generation circuit and to the command circuit, means connecting a first output of the control signal generation circuit to the signal composite circuit and a second output of the control signal generation circuit to the command circuit, means connecting the output of the command circuit to the signal composite circuit, and means connecting the output of the signal composite circuit to the control signal transmission line.

4. A control apparatus in accordance with claim 1 wherein the signal transmission line comprises a reference timing signal transmission line and a control signal transmission line and the central operation device comprises a reference timing signal generation circuit, a control signal generation circuit, a plurality of delay circuits, a command signal composite circuit, and a signal composite circuit, means connecting a first output of the reference timing signal generation circuit to the reference timing signal transmission line, means connecting a second output of the reference timing signal generation circuit to the control signal generation circuit and to the command signal composite circuit, means connecting a plurality of outputs of the control signal generation circuit to the plurality of delay circuits, means connecting a further output of the control signal generation circuit to the signal composite circuit, means connecting the outputs of the plurality of delay circuits to the command signal composite circuit, means connecting the output of the command signal composite circuit to the signal composite circuit and means connecting the output of the signal composite circuit to the control signal transmission line.

5. A control in accordance with claim 1 wherein the state detecting circuit comprises a resistor and a first AND gate, the state signal generation circuit comprises a second AND gate, the driving circuit comprises a set-reset flip-flop and a transistor, means connecting a first output of the signal division circuit to the set input of the set-reset flip-flop and means connecting a second output of the signal division circuit to the reset input of the set-reset flip-flop, means connecting a third output of the signal division circuits to a first input of the second AND gate, means connecting the output of the set-reset flip-flop to a first input of the first AND gate and to the transistor, means connecting the resistor between a power source and a second input of the first AND gate, means connecting the output of the transistor to the electrical device and to the second input of the first AND gate, means connecting the output of the first AND gate to a second input of the second AND gate and means connecting the output of the second AND gate to the reset input of the set-reset flip-flop.

* * * * *